UNITED STATES PATENT OFFICE.

FRITZ ACH, OF MANNHEIM, GERMANY, ASSIGNOR TO C. F. BOEHRINGER & SOEHNE, OF MANNHEIM-WALDHOF, GERMANY.

PARAÄMIDOPHENYL-GLYOXYLIC ACID AND PROCESS OF MAKING SAME.

SPECIFICATION forming part of Letters Patent No. 676,860, dated June 25, 1901.

Application filed May 29, 1900. Serial No. 18,424. (No specimens.)

*To all whom it may concern:*

Be it known that I, FRITZ ACH, a citizen of the Empire of Germany, residing at Mannheim, in the Empire of Germany, have invented certain new and useful Improvements in Preparations of Paraämidophenyl-Glyoxylic Acid; and I do hereby declare the following to be a full, clear, and exact description of the invention, such as will enable others skilled in the art to which it appertains to make and use the same.

This invention relates to the manufacture of amidophenyl-glyoxylic acids and in particular of paraämidophenyl-glyoxylic acid, its substitution products and homologues, all of which are comprised under the general designation of "paraämidophenyl-glyoxylic acids." Of these acids only one representative, para-dimethyl-amidophenyl-glyoxylic acid (described in *Berichte der Chemisch Gesellschaft*, Vol. 10, page 208,) has hitherto been known. A general method of preparation of this group of amido-ketone acids whose known representative has proved a highly active chemical reagent has not been found, and hence a satisfactory study of the properties of this interesting group has been wanting. I have discovered a method as a result of which this group may be readily produced, which is a matter of great importance, since they serve as the starting materials for the preparation of pharmacal products and dyestuffs. As a result of the experiments and researches in this direction I have found that the paraämidophenyl-tartronic acids which have been described in my application, Serial No. 731,674, filed September 25, 1899, are readily converted into the corresponding paraamidophenyl-glyoxylic acids when treated with mild oxidizing agents, carbon dioxid being split off coincidently.

My invention therefore, broadly considered, consists in the oxidation of a paraämidophenyl-tartronic acid.

The process, for example, in the case of preparing paraämidophenyl-glyoxylic acid proper from paraämidophenyl-tartronic acid proper is indicated in the equation:

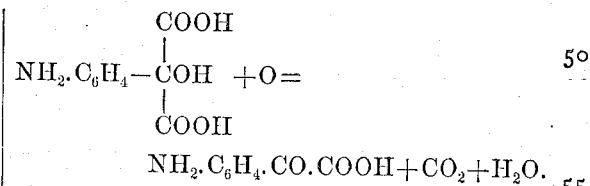

$$NH_2.C_6H_4.CO.COOH + CO_2 + H_2O.$$

As oxidizing agents I may employ peroxid of manganese, peroxid of lead, mercuric oxid, ferric chlorid, permanganate of potassium, arsenic acid, &c. The oxidation may be performed in an alkaline as well as an acid solution. The resultant paraämidophenyl-glyoxylic acids form yellow crystalline products which decompose acetates and form yellow-colored phenylhydrazones with phenyl-hydrazin, the crystalline chlorids of said hydrazones being soluble with difficulty in water.

I will now describe my invention in detail by reciting a number of examples showing the preferred way of carrying my invention into effect.

*1. Preparation of paraämidophenyl-glyoxylic acid* ($NH_2.C_6H_4.CO.COOH$) *from paraamidophenyl-tartronic acid.*—For the purpose of a full disclosure I will first describe the mode of preparation and properties of the starting product—the paraämidophenyl-tartronic acid. Twelve parts, by weight, of anilin-alloxan are gradually introduced, while stirring, into twenty-six parts, by volume, of potash lye, (KHO+Aq,) which has ten times the strength of normal potash lye and which has been previously heated on a boiling-water bath. The anilin-alloxan is rapidly dissolved, while at the same time an energetic evolution of ammonia takes place. As soon as all of the anilin-alloxan has gone into solution the whole is subjected to evaporation while being stirred. Under this treatment the solution gradually thickens to a stiff crystalline semiliquid mass or paste comprising an aggregation of fine needles, which needles consist of the dipotassium salt of paraämidophenyl-tartronic acid. This crystalline mass is then dissolved in warm water and the resultant solution evaporated for driving off the ammonia as completely as possible. The residue is thoroughly dried and is then dissolved in about thirty-six parts, by weight, of water under the influence of heat, and the resultant alkaline solution is then acidulated with a suitable acid—such as acetic acid, for example. Under this treatment the acid potassium salt of amidophenyl-tartronic acid is thrown out in the form of fine needles. This precipitate is then separated from the mother-liquor by siphoning, decanting, or in any other suitable manner after cooling. The remainder of the salt may be obtained from the mother-liquor by adding alcohol. In order to obtain the free acid, ten parts, by weight, of the acid potassium salt are dissolved in about two hundred parts, by weight, of warm water, 2.8 parts of potash lye (KHO+Aq) of ten times the normal strength being added. The resultant solution is treated with animal charcoal or other decolorizing agent and filtered, and the clear colorless filtrate is then treated with thirteen parts, by volume, of a solution of hydrochloric acid having six times the strength of the normal acid. Thereupon the paraämidophenyl-tartronic acid is thrown out in the form of shining colorless needles, such precipitation generally taking place already before the solution has cooled off. This crystalline mass after standing for a considerable time in the cold changes into a crystalline mass consisting of coarse generally square plates or tablets. After this mass has stood for some time in the cold the crystals are drained by siphoning or otherwise removing the mother-liquor and washed with some cold water. This acid is soluble in hot water with tolerable ease, more difficultly in alcohol. It cannot, however, be recrystallized from these solutions, since on heating the same carbonic acid is very soon evolved, the solutions becoming intensely yellow. Its formula is $NH_2.C_6H_4.C_3H_3O_5$. The normal alkali salts (including ammonium salt) which are readily soluble in water may be converted into the acid salts, which are difficultly soluble in cold water, by reacting thereon with acetic acid. Amidophenyl-tartronic acid is readily soluble without decomposition in dilute mineral acids and also in concentrated hydrochloric and sulfuric acids. On heating these solutions carbon dioxid is very soon liberated. This acid has no sharply-defined melting-point. On heating the same it begins to turn yellow at 150° centigrade, and from that point it becomes progressively darker with the elevation of temperature until decomposition takes place at from 215° to 220° centigrade, the decomposition being accompanied by frothing. An ammoniacal solution of the acid reduces a silver solution in the heat with formation of a shining silver mirror. The paraämidophenyl-tartronic acid obtained as above or in any way is then subjected to oxidation in the following manner: A mixture of fifteen parts finely-powdered brownstone or Weldon mud and two hundred parts of water is heated to the boiling-point, and at this temperature twenty parts of the acid potassium salt of paraämidophenyl-tartronic acid are gradually introduced during the period of a quarter of an hour, the whole being constantly stirred. Vigorous evolution of carbonic-acid gas takes place, the reaction proceeding according to the equation:

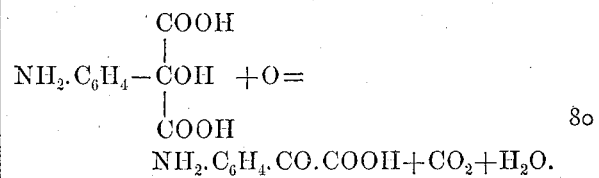

$$NH_2.C_6H_4.CO.COOH + CO_2 + H_2O.$$

After the whole has been introduced the mixture is boiled for about a quarter of an hour, whereupon the same is placed on the filter hot to separate from the manganese sediment. To the filtrate soda solution ($Na_2CO_3$) is added until the precipitation of carbonate of manganese ceases. Thereupon the filtrate is drained from the precipitate or sediment, evaporated down to twenty parts, and treated with carbon for decolorization, &c., and hydrochloric acid is added until it reacts weakly acid on Congo paper. It is then allowed to stand in the cold for several hours, whereby the crystallization of the paraämidophenyl-glyoxylic acid is completed. The resultant yellow product is redissolved in water and treated with carbon (animal charcoal) for the purpose of further purification. From the resultant clear gold-yellow solution when rapidly cooled the new acid is thrown out in the form of yellow fine shining needles and in the form of coarse brownish laminæ when slowly cooled.

The paraämidophenyl-glyoxylic acid has no melting-point. On heating to 170° centigrade it turns brown and softens at about 190° centigrade. On raising the temperature still higher it again attains a light yellow color and decomposes at a temperature above 400° centigrade. This new acid is readily soluble in warm alcohol and hot water, but difficultly soluble in ether and benzene. It is, moreover, readily soluble in alkalies, ammonia, alkali carbonates, and on warming gently in dilute mineral acids.

If a solution of paraämidophenyl-glyoxylic acid is treated with a solution of chlorid of phenylhydrazin and the same is heated to 90° centigrade, a precipitate consisting of fine canary-colored needles is thrown down after a short time, said precipitate consisting of the chlorid of phenylhydrazone. If this precipitate is dissolved in hot water and sodium acetate added thereto, the phenylhydrazone itself is thrown out in the form of fine yellow needles, which may be obtained in the form of short yellow prisms by recrystallizing from alcohol of seventy-five per cent. strength. These crystals turn orange yellow on heating to 160° centigrade and melt with decomposition at 163° to 164° centigrade.

The anilin-alloxan or anil-alloxan used in the preparation of the starting product above as well as its mode of preparation have been described in Pelizzari's paper in the *Gazetta Chimica*, Vol. 17, page 412, et seq.

2. *Preparation of para-dimethylamidophenyl-glyoxylic acid,* $(CH_3)_2N.C_6H_4CO.COOH$, *from para-dimethylamidophenyl-tartronic acid.*—The starting product for this reaction, the para-dimethylamidophenyl-tartronic acid, has been described in my aforesaid application, Serial No. 731,674, filed September 25, 1899. Its formula is $(CH_3)_2N.C_6H_4.C_3H_3O_5$. It crystallizes in coarse flat prisms pointed at one end and decomposes at 109° to 110° centigrade, its decomposition being preceded by slight coloration and attended with frothing or effervescence. The said starting product is obtained from dimethyl-anil-alloxan, described by Pelizzari in *Gazetta Chimica Italiana*, Vol. 17, page 412, et seq., by subjecting it to substantially the same treatment as given under the first example herein for the preparation of paraämidophenyl-tartronic acid from anilin-alloxan, the proportions of mixture being of course governed by the different molecular weights, as will be readily understood.

In order to prepare the new glyoxylic acid, I take twenty-eight parts of the mono-potassium salt of para-dimethyl-amidophenyl-tartronic acid and introduce the same gradually into a boiling mixture of three hundred parts of water and thirty parts of mercuric oxid suspended therein, the suspension mixture being stirred during the introduction. A vigorous evolution of carbon-dioxid gas takes place at this stage. After all of the phenyl-tartronic salt has been introduced the whole is kept warm for a half-hour and continually stirred. The resultant solution is then drained from the residual sediment of mercury and unchanged oxid by placing the whole upon the filter. The filtrate is then acidulated with hydrochloric acid until the same shows a weak reaction on Congo paper, and it is then allowed to cool. The para-dimethyl-amidophenyl-glyoxylic acid is thereby thrown out in the form of small yellow shining foliated or lamellar crystals. The reaction resulting in this acid proceeds according to the equation:

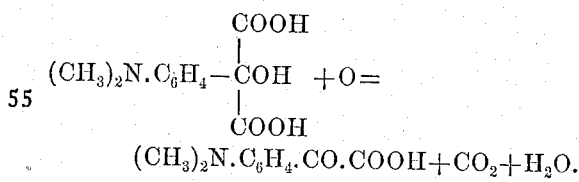

$(CH_3)_2N.C_6H_4.CO.COOH + CO_2 + H_2O$.

I was not able to establish melting-point of 187° centigrade, given by Michler and Hanhardt in *Berichte der d. Chemisch Gesellschaft*, Vol. 10, page 2081. According to my observations the acid after having been several times purified will soften at a temperature of 150° centigrade and decomposes at 195° centigrade.

The phenylhydrazone of para-dimethyl-amidophenyl-glyoxylic acid softens at 175° centigrade, and when the temperature is slowly raised from this point it decomposes at 181° centigrade.

3. *Preparation of para-diethyl-amidophenyl-glyoxylic acid,* $(C_2H_5)_2N.C_6H_4.CO.COOH$, *from para-diethyl-amidophenyl-tartronic acid.*—The starting product for this method, the para-diethyl-amidophenyl-tartronic acid, has been described in my aforesaid application, Serial No. 731,674. Its formula is $(C_2H_5)_2N.C_6H_4.C_3H_3O_5$. It crystallizes in fine needles, which are decomposed with attendant frothing at 107° to 108° centigrade. The said starting product is prepared from diethyl-anil-alloxan, whose properties and mode of preparation are also set forth in my aforesaid application, by subjecting it to substantially the same treatment as given under the first example herein for the preparation of para-amido-phenyl-tartronic acid from anil-alloxan, the proportions of mixture being, of course, adapted to the different molecular weights, as will be readily understood. As will be seen from said application, Serial No. 731,674, the diethyl-anil-alloxan used in the preparation of the above starting material is prepared by heating its components, the diethyl-anilin and alloxan, in preferably molecular quantities in aqueous alcoholic solution, preferably in the presence of a weak acid, such as acetic acid. The condensation product separates while the solution is still warm. When the same is completely thrown out, the mother-liquor is drained and the residual condensation product is washed with water and a little alcohol. The formula of diethyl-anil-alloxan is $C_{14}H_{17}N_3O_4$. It is sparingly soluble in hot water, but readily in boiling alcohol, out of which it crystallizes in the form of coarse shining prisms. It softens at 190° centigrade and melts with decomposition at from 210° to 212° centigrade.

Proceeding now to the preparation of the new acid, I take forty-six parts of the mono-potassium-salt of para-diethyl-amido-phenyl-tartronic acid and dissolve them in five hundred parts water. This solution is cooled to +4° centigrade and gradually poured into a solution of 15.5 parts of permanganate of potash in five hundred parts of water, the second solution being also cooled to +4° centigrade. It should be observed that during the course of the reaction the temperature should at no time rise to above +5° centigrade. After the oxidation has been completed the resultant solution is filtered from the residual brownstone, the filtrate highly evaporated and decolorized and purified by treatment with carbon, (animal charcoal,) as will be readily understood, and then acidulated with hydrochloric acid until it reacts faintly on congo. By this treatment the major part of the new product, the para-diethyl-amido-phenyl-glyoxylic acid, is thrown out in a crystalline state, while the balance may be obtained by extraction with ether. The acid is then redissolved in benzene to which ligroin has been added. Out of this solution it crystallizes in the shape of short yellow prisms aggregated in fan-shaped arrangement.

The reaction to which the production of the new acid is due proceeds according to the equation:

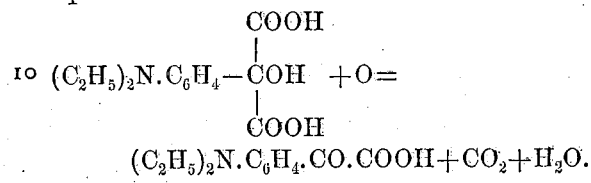

This new acid is readily soluble in alcohol, acetic ether, chloroform, acetone, in ether and hot water, in alkalies, alkali carbonates, and dilute mineral acids. It softens when heated to 104° centigrade and melts at 114° to 116° centigrade to yellowish-red liquid, the melting being attended with evolution of gas.

The chlorid of the hydrazone of the same crystallizes in shining straw-colored flattened needles.

4. *Preparation of paraämido-meta-toluyl-glyoxylic acid* ($NH_2.C_7H_6.CO.COOH$) *from paraämido-meta-toluyl-tartronic acid.*—For the purpose of a full disclosure I will first describe the mode of preparation and the properties of the starting product, the paraämido-meta-toluyl-tartronic acid, which forms the subject-matter of my aforesaid application. Twenty-five parts, by weight, of ortho-toluidin-alloxan is gradually introduced into fifty-two parts, by volume, of potash lye ($KHO + Aq$) of ten times normal strength, which has been previously heated on a boiling-water bath, the introduction being accompanied by stirring. After the solution has been effected the same is evaporated to completely drive off the ammonia. The residual crystalline mass is then dissolved in water, and this solution is also evaporated. The residue, which should be as dry as possible, is brought into solution with a small amount of water (about five parts, by volume) and application of heat, (35° centigrade.) The clear brownish-yellow solution thus obtained is then slightly acidulated with any suitable acid—such, for example, as acetic acid. Upon adding to this solution from three to four parts, by volume, of alcohol the acid potassium salt of paraämido-meta-toluyl-tartronic acid is thrown out, and after the same has stood for sometime (about twenty hours) in the cold the mother-liquor is drained from the precipitate in any suitable manner—such, for example, as siphoning or decanting.

To obtain the free acid, the mono-potassium salt is dissolved in two parts, by volume, of water at a gentle heat, and hydrochloric acid is then added until the same colors Congo paper. From the solution thus prepared the new compound, paraämido-meta-toluyl-tartronic acid, begins to precipitate while still warm in the form of needles grouped in star-shaped aggregations which are only slightly colored. The crystallization is completed after the solution has stood for sometime in the cold. This new acid, whose formula is $NH_2.C_7H_6.C_3H_3O_5$, is readily soluble in mineral acids and dilute alkalies, including ammonia. An ammoniacal solution of the same will reduce an ammoniacal silver solution when heated, a silver mirror being formed. It begins to turn yellow when heated to over 150° centigrade. On raising the temperature above this point the compound gradually and progressively becomes darker until it is dark brown. At 194° to 195° centigrade it is decomposed, the decomposition being accompanied by foaming or frothing.

The orthotoluidin-alloxan from which the above starting material is obtained, as set forth in my above-specified application, Serial No. 731,674, is prepared by heating its components (toluidin and alloxan) together in preferably molecular quantities in aqueous alcoholic solution, preferably in the presence of acetic acid. The condensation product separates while the solution is still warm. When the same is completely thrown out, the mother-liquor is drained therefrom and the residual condensation product is washed with water and a little alcohol.

The formula of the orthotoluidin-alloxan is $C_{11}H_{11}N_3O_4$. It is soluble with difficulty in hot alcohol and moderately so in boiling water, from which it crystallizes in the form of well-developed colorless obliquely-truncated prisms. At 220° centigrade it begins to turn to a brownish color, at 240° centigrade it softens, and it melts with decomposition at 252° centigrade.

In preparing the new glyoxylic acid I take a solution of eighteen parts of the mono-potassium salt of the paraämido-meta-toluyl-tartronic acid in three hundred and sixty parts of water, cool the same to $+4°$ centigrade, and add thereto a cooled ($+4°$ centigrade) solution of 6.9 parts permanganate of potash in four hundred and twenty parts of water. The latter solution is added gradually and while stirring. After the oxidation is completed the sediment of brownstone is removed by filtering, and the filtrate is evaporated down to from fifty to sixty parts and then acidulated with hydrochloric acid until it reacts faintly on congo. After standing for several hours the glyoxylic or ketonic acid will have partly crystallized out of the solution and the mother-liquor is drained from the same, the balance of the new acid being obtained therefrom by extraction with ether.

The reaction which takes place in the formation of the new compound proceeds according to the equation:

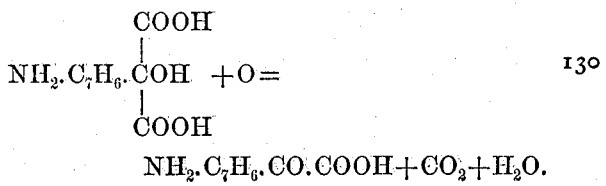

For the purpose of purification it is redissolved in boiling water and is obtained from such solution in the form of yellow short needles aggregated in bundles or sheaves. It is readily soluble in alcohol, acetone, and acetic ether, but soluble with difficulty in chloroform and ether. On heating to about 150° centigrade the acid becomes darker, and it melts at 163° to 164° centigrade with decomposition. The phenylhydrazone of the same is yellow and melts at 179° centigrade with decomposition.

5. *Preparation of para-ethylene-diamido-diphenyl-glyoxylic acid*, $C_2H_4N_2H_2(C_6H_4.CO.COOH)_2$, *from para-ethylene-diamido-diphenyl-tartronic acid.*—For the purpose of a full disclosure I will first describe the mode of preparation and the properties of the starting product, the para-ethylene-diamido-diphenyl-tartronic acid, $(C_2H_4:N_2H_2:)C_6H_4.C_3H_3O_5)_2$, which forms the subject-matter of my aforesaid application, Serial No. 731,674. Five parts, by weight, of ethylene-diphenyl-diamido-dialloxan are dissolved warm in 10.5 parts, by volume, (corresponding to ten and one-half molecules,) of a solution of hydrate of potassium having ten times the strength of normal potash-lye. The solution is evaporated until crystallization takes place. The crystals are then dissolved in water and the solution is again evaporated. The crystalline residue is then taken up with a minimum quantity of warm water (35° centigrade) and then acidulated with a suitable acid, such as, preferably, glacial acetic acid, and finally treated with alcohol. As a result of this treatment a concentrated aqueous solution of the acid potassium salt is first separated, which solution subsequently after standing for some time will be found to be in the form of a thick syrup covered by a layer of alcoholic lye. This supernatant lye may be poured off from the said syrup. The acid potassium salt of the new compound thus freed from the lye is then triturated with alcohol, whereby it is caused to assume a crystalline structure. The crystallized mono-potassium salt thus obtained is then dissolved warm in a little water, (about three parts, by volume.) The resultant red solution is then treated with a decolorizing agent, such as animal charcoal, and filtered, and the filtrate is slightly acidulated with a suitable acid, such as hydrochloric acid, for example. The new compound para-ethylene-diamido-diphenyl-tartronic acid is thus obtained in the form of a slightly-colored fine crystalline precipitate, which will form in spheroidal aggregates when crystallization takes place slowly. This new acid is readily soluble in alkalies and mineral acids. An ammoniacal solution of the same reduces an ammoniacal silver solution in the presence of heat with formation of a silver mirror. On heating the said new acid above 300° centigrade it gradually becomes dark brown, and it is decomposed without melting at a temperature above 400° centigrade. The formula of the new acid is $$C_2H_4:N_2H_2:(C_6H_4.C_3H_3O_5)_2.$$

The ethylene-diphenyl-diamido-dialloxan from which the above starting material is obtained, as set forth in my aforesaid application, Serial No. 731,674, is prepared by heating the components (the ethylene-diphenyl-diamin and alloxan) together in preferably molecular proportions in aqueous alcoholic solution, preferably in the presence of acetic acid. The condensation product separates while the solution is still warm. When the same is completely thrown down, the mother-liquor is drained therefrom and the remaining condensation product is washed with water and a little alcohol.

The formula of the condensation product ethylene-diphenyl-diamido-dialloxan is $$C_{22}H_{20}N_6O_8.$$

It is soluble with difficulty in alcohol. From a concentrated alcoholic solution of the same it is obtained in coarse shining prisms containing one molecule $C_2H_6O$. At 215° centigrade these crystals stick together, and they darken and are decomposed without melting at 220° centigrade. Out of boiling water or dilute alcohol it crystallizes in fine acicular crystals, which soften at 190° centigrade and are decomposed at about 215° centigrade.

In preparing the present glyoxylic acid I dissolve ten parts of the acid potassium salt of the para-ethylene-diamido-diphenyl-tartronic acid in seventy-five parts of water and twenty-five parts of acetic acid and pour this solution gradually and while stirring into a mixture consisting of fourteen parts of brownstone (Weldon mud) suspended in seventy-five parts of boiling water. After the evolution of carbon-dioxid gas has ceased the boiling is continued for from fifteen to twenty minutes, and the resultant solution is then filtered from the sediment of brownstone and evaporated down to a considerable extent and slightly acidulated with hydrochloric acid. A brownish-yellow precipitate is thereby thrown down, which is then purified by redissolving in alkali and treating with carbon (animal charcoal) for decolorization, as will be readily understood, precipitating with HCl.

The reaction by which the new acid is formed proceeds according to the equation:
$$C_2H_4:N_2H_2:(C_6H_4.C_3O_5H_3)_2+O_2=$$
$$C_2H_4:N_2H_2:(C_6H_4.CO.COOH)_2+2CO_2+2H_2O.$$

This new acid, whose formula is $$C_2H_4.N_2H_2:(C_6H_4.CO.COOH)_2,$$
is dissolved with difficulty in hot water and is thrown out of the same in the form of yellowish-brown granular crystals. In boiling water it is tolerably soluble, crystallizing therefrom after standing for some time in the form of indistinct crystalline spheroidal aggregations. On heating to about 175° centigrade the acid softens, and at 205° to 208° it melts with decomposition. In addition to the above the following acids of this group have been prepared by me by proceeding according to the method above described and substituting the corresponding tartronic acids.

6. *Para-methyl-amidophenyl-glyoxylic acid.* (Formula: $CH_3.NH.C_6H_4.CO.COOH$.)—This acid crystallizes from hot water in orange short and well-developed prisms. It is readily soluble in boiling water, cold alcohol, acetone, and acetic ether, but soluble with difficulty in cold chloroform, ether, and benzene. It softens on heating to 140° centigrade and is decomposed with effervescence or frothing at 155° to 157° centigrade. The phenylhydrazone of the same crystallizes in small thick prisms, which melt with decomposition at about 164° centigrade.

7. *Para-ethyl-amidophenyl-glyoxylic acid.* (Formula: $C_2H_3.NH.C_6H_4.CO.COOH$.)—This acid crystallizes from boiling benzene in the shape of orange-yellow lamellar or prismatic crystals, which begin to soften when heated to 113° centigrade and decompose with liberation of gas at 116° centigrade. It is very readily soluble in alcohol, acetone, and acetic ether, tolerably so in ether, and readily in hot water, from which it crystallizes in well-developed yellowish-brown prisms. The chlorid of its phenylhydrazone crystallizes in canary-colored fine needles.

8. *Para-ethyl-amido-meta-toluyl-glyoxylic acid.* (Formula: $C_2H_5.NH.C_7H_6.CO.COOH$.)—Readily soluble in hot alcohol, acetone, and acetic ether, and not so readily in hot ether and water. Out of a not too concentrated hot aqueous solution it crystallizes in the form of compact short small needles which are concentrically grouped in part. The acid melts at 132° to 134° centigrade when heated slowly, the melting being attended with frothing and dark-reddish-brown coloration.

9. *Paraämido-meta-methoxy-phenyl-glyoxylic acid.* (Formula: $NH_2.CH_3O.C_6H_4.CO.COOH$.)—Readily soluble in boiling water, cold alcohol, acetone, and acetic ether, slightly soluble in ether, and crystallizes out of water in compact yellowish-brown concentrically-aggregated laminæ or plates. On heating above 125° the acid becomes darker in color. It begins to soften at about 140° centigrade and melts with decomposition at from 147° to 148° centigrade.

10. *Para-phenylamido-phenyl-glyoxylic acid.* (Formula: $C_6H_5.NH.C_6H_4.CO.COOH$.)—The free acid could hitherto be obtained only in the form of a tough reddish-yellow resin. The phenylhydrazone of the same crystallizes in the form of compact prisms out of dilute alcohol. These crystals become darker in color at 155° centigrade, and thereafter begin to soften and collapse, decomposing at 168° centigrade.

11. *Para-methyl-benzyl-amidophenyl-glyoxylic acid.* (Formula: $(CH_3)(C_7H_7):N.C_6H_4.CO.COOH$.)—This acid is precipitated out of water at first in the form of a yellow oil, which congeals or solidifies to long yellow acicular crystals. Out of dilute alcohol it crystallizes in the form of compact flat needles. It is readily soluble in alcohol, acetic ether, and acetone, tolerably so in ether, and less in boiling water. On heating to 70° centigrade the acid begins to soften, and it melts at 85° to 87° centigrade with liberation of gas.

What I claim, and desire to secure by Letters Patent of the United States, is—

1. In the art of preparing a paraämidophenyl-glyoxylic acid, the process which consists in oxidizing a paraämido-tartronic acid.

2. The process which consists in adding to an oxidizing agent together with water an alkali salt of a paraämidophenyl-tartronic acid.

3. The process which consists in adding to an oxidizing agent together with water an alkali salt of a paraämidophenyl-tartronic acid, while agitating the mixture, then filtering and finally acidulating the filtrate.

4. The process which consists in adding to an oxidizing agent together with water an alkali salt of a paraämidophenyl-tartronic acid while agitating the mixture, then filtering and finally acidulating the filtrate, then cooling and redissolving and cooling rapidly.

5. The process which consists in introducing the acid potassium salt of paraämidophenyl-tartronic acid into a heated mixture of manganese dioxid and water.

6. The process which consists in introducing the acid potassium salt of paraämidophenyl-tartronic acid into a heated mixture of manganese dioxid and water, the addition being carried out gradually and while stirring, then boiling for a short time and filtering.

7. The process which consists in introducing the acid potassium salt of paraämidophenyl-tartronic acid into a heated mixture of manganese dioxid and water, the addition being carried out gradually and while stirring, then boiling for a short time and filtering, then evaporating the filtrate and acidulating with a mineral acid until weak acid reaction on congo takes place and finally cooling.

8. The process which consists in introducing the acid potassium salt of paraämidophenyl-tartronic acid into a heated mixture of manganese dioxid and water, the addition being carried out gradually and while stirring, then boiling for a short time and filtering, then evaporating the filtrate and acidulating with a mineral acid until weak acid reaction on congo takes place, and finally cooling, then redissolving in water, adding carbon and rapidly cooling, whereby the resultant paraämidophenyl-glyoxylic acid is thrown out in acicular crystals.

9. As a new chemical compound paraämidophenyl-glyoxylic acid proper which has the formula hereinabove stated, is readily soluble in warm alcohol and hot water, in alkalies including ammonia, alkali carbonates and on warming gently in dilute mineral acids, but soluble with difficulty in ether and benzene, has no melting-point, turns brown on heating to 170°, centigrade, softens at about 190°, centigrade, and on raising the temperature above this point again attains a light color and decomposes at a temperature above 400°, centigrade.

In testimony whereof I affix my signature in presence of two witnesses.

FRITZ ACH.

Witnesses:
 LORENZ ACH,
 JACOB ADRIAN.